(No Model.) 2 Sheets—Sheet 1.

L. M. S. RUTTER & R. WYSONG.
COOKING UTENSIL.

No. 251,736. Patented Jan. 3, 1882.

Witnesses.
J. B. Toulmin
A. H. Toulmin

Inventors.
Liberty M. S. Rutter
Rebecca Wysong
By Morton Toulmin
Attorney.

N. PETERS, Photo-Lithographer, Washington, D. C.

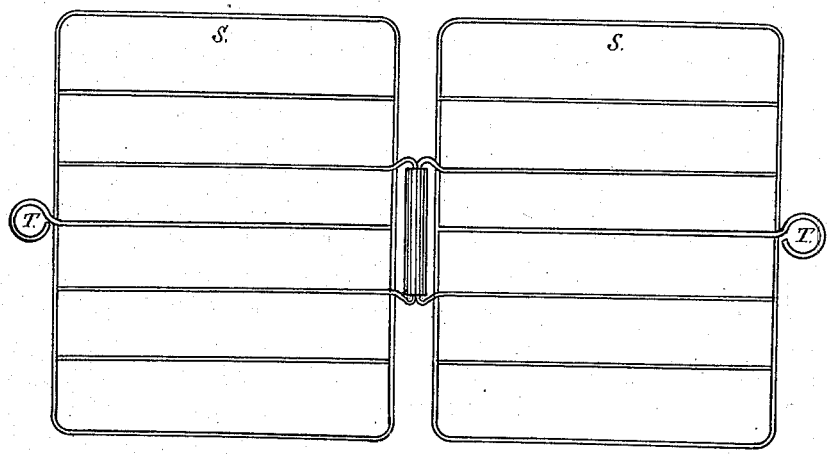
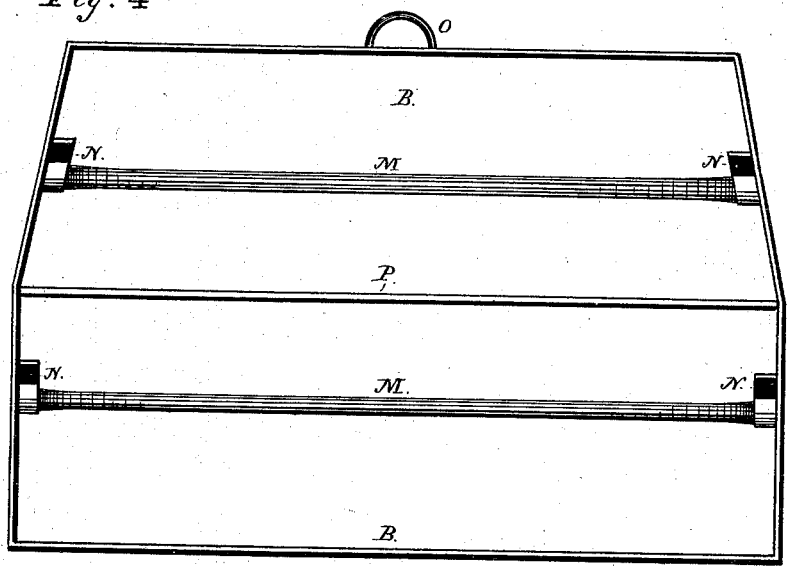

UNITED STATES PATENT OFFICE.

LIBERTY M. S. RUTTER AND REBECCA WYSONG, OF WILLIAMSPORT, PA.

COOKING UTENSIL.

SPECIFICATION forming part of Letters Patent No. 251,736, dated January 3, 1882.

Application filed October 20, 1881. (No model.)

*To all whom it may concern:*

Be it known that we, LIBERTY M. S. RUTTER and REBECCA WYSONG, citizens of the United States of America, residing at Williamsport, in the county of Lycoming and State of Pennsylvania, have invented certain new and useful Improvements in Cooking Utensils; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of cooking utensils in which the food to be cooked is placed in a polished sheet-metal box, preferably of tin, open on the side next the fire, the back, top, and sides so arranged as to reflect and concentrate the heat upon the articles which are being cooked.

Figure 1:
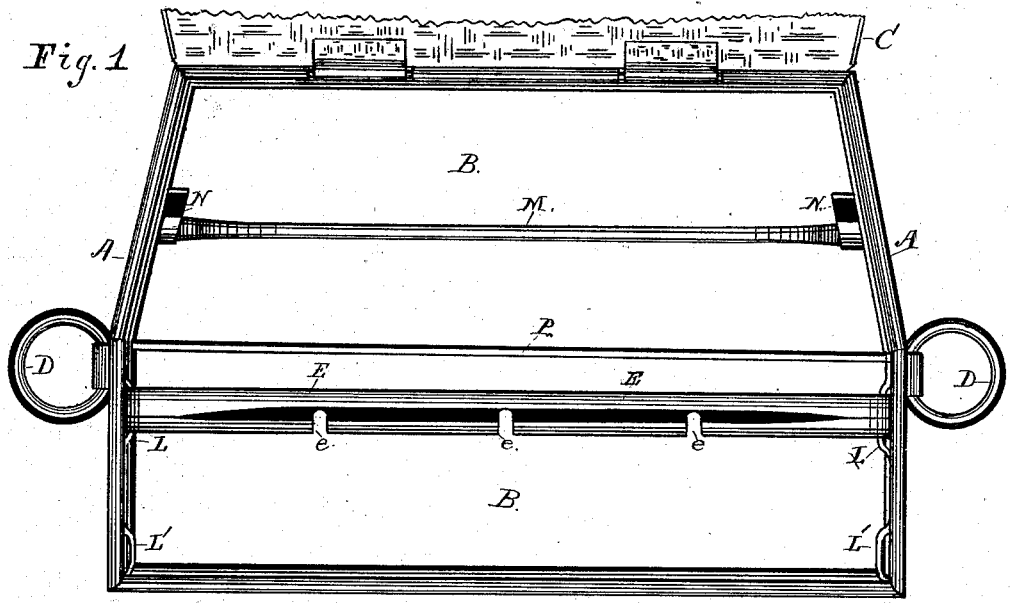
Figure 2:
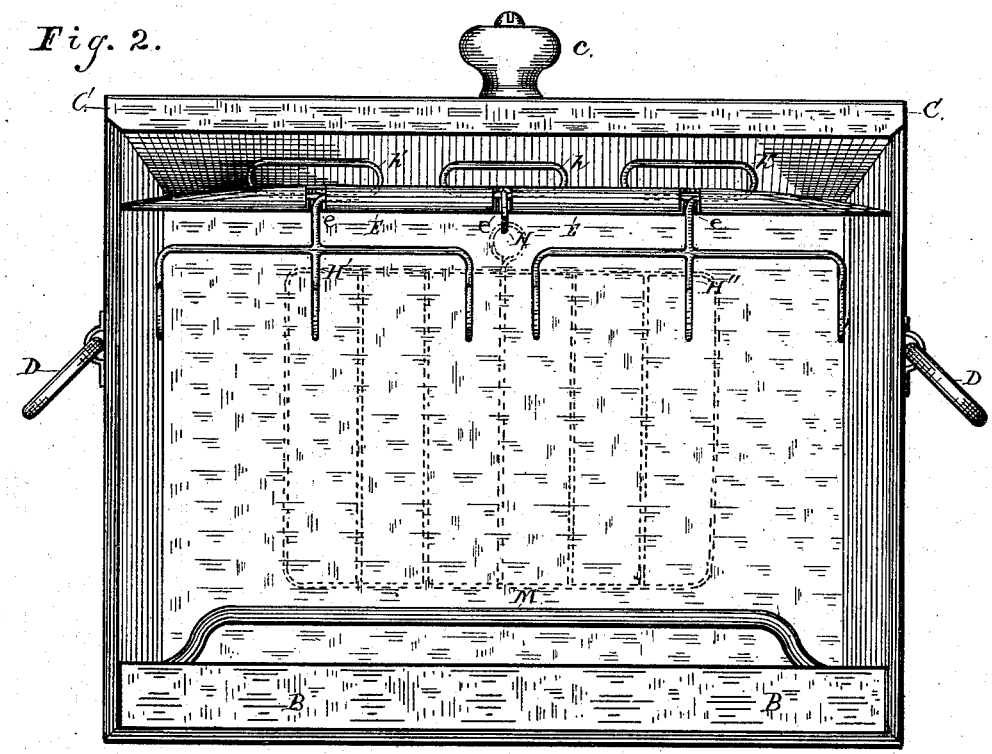

Figure 1 is a plan view of the box, showing a hinged top partly broken away. Fig. 2 is a front elevation of the box, taken from the open side, which is placed next the fire. Fig. 3 is the fish basket or broiler, also shown in dotted lines in Fig. 2. Fig. 4 is a plan view of the pan B, shown also in Figs. 1 and 2.

A is the body of the box.

C is the cover of the box, provided with a knob or handle, c, for convenience in opening and shutting.

B is the pan, divided into two parts by the partition or shelf P, and provided with lugs N, into which the ends of the rods M are inserted and held in place; also, with a ring, O, at the top, by which it may be suspended in a vertical position to the hook H.

D are rings forming handles to the box A.

E is a rod, made preferably of sheet metal, bent into a tube, so as to present a longitudinal opening or groove at the top. It is also provided with notches e, and its ends are bent down and flattened so as to form hooks, which enter freely the loops L L', placed on both sides of the box A.

h h' h'' are loops or handles, each provided with one or more hooks, H H' H'', from which the pan B and the basket S, or articles to be cooked, may be suspended, the handles h h' h'' affording a ready means to remove and change the position of such articles when necessary.

S is a fish basket or broiler.

For cooking, place the box A before an open fire or stove.

To toast bread, hang the pan B by its ring O to the hook H; place the slices of bread in the pan B, behind the rods M, which will prevent their falling out, as the pan will hang straight when on the hook H.

To broil meat, remove the rods M from the pan B and place the pan in the bottom of the box A. The meat is then hung to either of the hooks H' or H'', and the pan B will catch the drippings.

To broil fish, place the fish in the fish-basket; then close it and hang it on the central hook, H. Either of the hooks can be taken out or left in at will.

We claim as our invention—

1. The oven A, in combination with the removable pan B, having partition P and removable rods M, and provided with means of suspension within the oven A, as shown and described, and for the purposes set forth.

2. The oven A, in combination with the rod E, provided with notches e, and so arranged as to be removed from the loops L L', as shown and described, and for the purposes set forth.

3. The box A, provided with a hinged cover, C, handles D, and loops L L', in combination with the rod E and hooks H H' H'', as shown and described, and for the purposes set forth.

In testimony whereof I affix my signature in presence of two witnesses.

LIBERTY M. S. RUTTER.

Witnesses:
GEO. M. D. GUISE,
WILLIAM TALLMAN.

In testimony whereof I affix my signature in presence of two witnesses.

REBECCA WYSONG.

Witnesses:
A. AMELIA WYSONG,
JOHN W. LOCKE.